(12) United States Patent
Mitsunaga et al.

(10) Patent No.: US 12,553,734 B2
(45) Date of Patent: Feb. 17, 2026

(54) LIGHT EMITTING DEVICE, CONTROL METHOD FOR LIGHT EMITTING DEVICE, AND MEDIUM

(71) Applicants: PIONEER CORPORATION, Tokyo (JP); PIONEER ELECTRONICS (USA) INC., Torrance, CA (US)

(72) Inventors: Naoki Mitsunaga, Tokyo (JP); Naoki Fujimura, Tokyo (JP); Yoshikazu Sakai, Tokyo (JP); Mizuki Suguru, Tokyo (JP); Hideki Nagata, Tokyo (JP); Hideki Ono, Torrance, CA (US); Teruaki Kaiya, Torrance, CA (US); Isao Kurata, Torrance, CA (US); Makoto Yaji, Torrance, CA (US); Toshiyuki Murata, Kawagoe (JP); Takuya Hirose, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 249 days.

(21) Appl. No.: 18/208,669

(22) Filed: Jun. 12, 2023

(65) Prior Publication Data

US 2024/0401966 A1  Dec. 5, 2024

Related U.S. Application Data

(60) Provisional application No. 63/470,670, filed on Jun. 2, 2023.

(51) Int. Cl.
*G01C 21/36* (2006.01)
*B60Q 3/18* (2017.01)
(Continued)

(52) U.S. Cl.
CPC .......... *G01C 21/3626* (2013.01); *B60Q 3/18* (2017.02); *B60Q 3/20* (2017.02); *B60Q 3/70* (2017.02); *H05B 45/10* (2020.01); *H05B 45/20* (2020.01)

(58) Field of Classification Search
CPC ........ B60Q 2500/30; B60Q 3/18; B60Q 3/76; B60Q 3/74; H05B 45/10; H05B 45/20;
(Continued)

(56) References Cited

U.S. PATENT DOCUMENTS 10,940,790 B1 * 3/2021 Mazuir .................... B60Q 3/80
2016/0152178 A1 * 6/2016 Peterson .................. B60Q 3/80
315/77

(Continued)

FOREIGN PATENT DOCUMENTS

JP  2003-054334 A  2/2003
JP  2005-274433 A  10/2005

*Primary Examiner* — Monica C King
(74) *Attorney, Agent, or Firm* — Procopio, Cory, Hargreaves & Savitch LLP

(57) ABSTRACT

A light emitting device is located inside a vehicle and emits light toward an occupant compartment where an occupant is seated. The light emitting device comprises a light emitting unit and a control unit. The light emitting unit has a plurality of light emission regions. The plurality of light emission regions are arranged along one direction. The control unit controls the light emission region using at least one of first information related to an operation of the vehicle in which the light emitting device is mounted and second information related to an operation of an output unit that performs output toward the occupant compartment of the vehicle.

19 Claims, 15 Drawing Sheets

(51) Int. Cl.
 *B60Q 3/20* (2017.01)
 *B60Q 3/70* (2017.01)
 *H05B 45/10* (2020.01)
 *H05B 45/20* (2020.01)

(58) Field of Classification Search
 CPC ............ H05B 47/10; B64D 2011/0038; B64D 2203/00; B64D 2011/0053; G06V 20/59; F21S 4/28; F21S 43/14
 See application file for complete search history.

(56) References Cited

U.S. PATENT DOCUMENTS

| | | | |
|---|---|---|---|
| 2016/0353551 A1* | 12/2016 | Despres | B60Q 3/47 |
| 2018/0098201 A1* | 4/2018 | Torello | H02J 13/00028 |
| 2023/0365271 A1* | 11/2023 | Diaz | B60K 35/60 |
| 2024/0206406 A1* | 6/2024 | Sibitzky | F21V 5/007 |

* cited by examiner

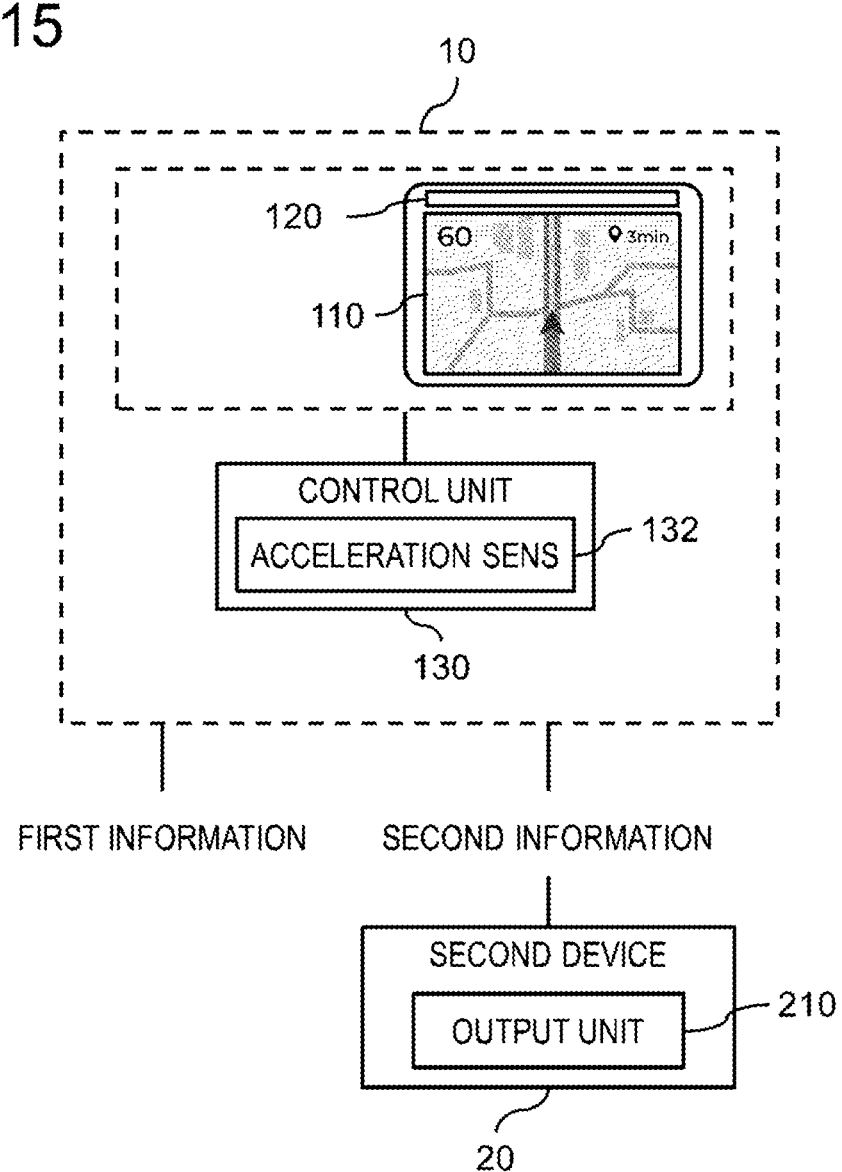

LIGHT EMITTING DEVICE, CONTROL METHOD FOR LIGHT EMITTING DEVICE, AND MEDIUM

BACKGROUND OF THE INVENTION

Field of the Invention

The present invention relates to a light emitting device, a control method for a light emitting device, and a medium.

Background Art

It has been studied to convey information to a driver of a vehicle through a light emission state of a light emitting device. For example, PTL 1 describes a vehicle display apparatus comprising a light emitting device provided with LEDs at both ends of a light guide tube, and a light emitting control circuit that controls the light emitting device. The light emitting control circuit, for example, increases a current value applied to the LED on the right side of the light guide tube when a control signal for a right turn instruction is received from a navigation system.

Further, PTL 2 describes a navigation device that informs a user of a distance to a guided intersection by changing the number of display segments according to the distance to the guided intersection.

CITATION LIST

Patent Literature

[PTL 1] Japanese Unexamined Patent Publication No. 2003-54334

[PTL 2] Japanese Unexamined Patent Publication No. 2005-274433

SUMMARY OF THE INVENTION

In a case of conveying information to a person inside a vehicle through the light emission state of the light emitting device, it is necessary to ensure that the information is easily conveyed to the person.

An example of an object of the present invention is to ensure that information is easily conveyed to a person inside a vehicle in a case of conveying the information to the person through a light emission state of a light emitting device.

The invention according to claim 1 relates to a light emitting device that is located inside a vehicle and emits light toward an occupant compartment where an occupant is seated, the light emitting device comprising:

a light emitting unit that has a plurality of light emission regions aligned along one direction; and
a control unit that controls the light emitting unit,
wherein the control unit controls at least one of a light emission intensity and a light emission color of the light emission region for each of the plurality of light emission regions, and
wherein the control unit controls the plurality of light emission regions using at least one of first information related to an operation of the vehicle and second information related to an operation of an output unit configured to perform output toward the occupant compartment.

The invention according to claim 17 relates to a control method of a light emitting device that is located inside a vehicle and emits light toward an occupant compartment where an occupant is seated, the light emitting device comprising a light emitting unit that has a plurality of light emission regions aligned along one direction, the control method comprising:
through at least one computer,
controlling at least one of a light emission intensity and a light emission color of the light emission region for each of the plurality of light emission regions; and
controlling the plurality of light emission regions using at least one of first information related to an operation of the vehicle and second information related to an operation of an output unit configured to perform output toward the occupant compartment.

The medium according to claim 18 relates to a medium that stores a program for controlling a light emitting device that is located inside a vehicle and emits light toward an occupant compartment where an occupant is seated, the light emitting device comprising a light emitting unit that has a plurality of light emission regions aligned along one direction,
the medium causing at least one computer to:
control at least one of a light emission intensity and a light emission color of the light emission region for each of the plurality of light emission regions; and
control the plurality of light emission regions using at least one of first information related to an operation of the vehicle and second information related to an operation of an output unit configured to perform output toward the occupant compartment.

BRIEF DESCRIPTION OF THE DRAWINGS

FIG. 15 is a diagram showing an example of a functional configuration of a light emitting device according to a modification example.

DETAILED DESCRIPTION OF THE INVENTION

Figure 1:
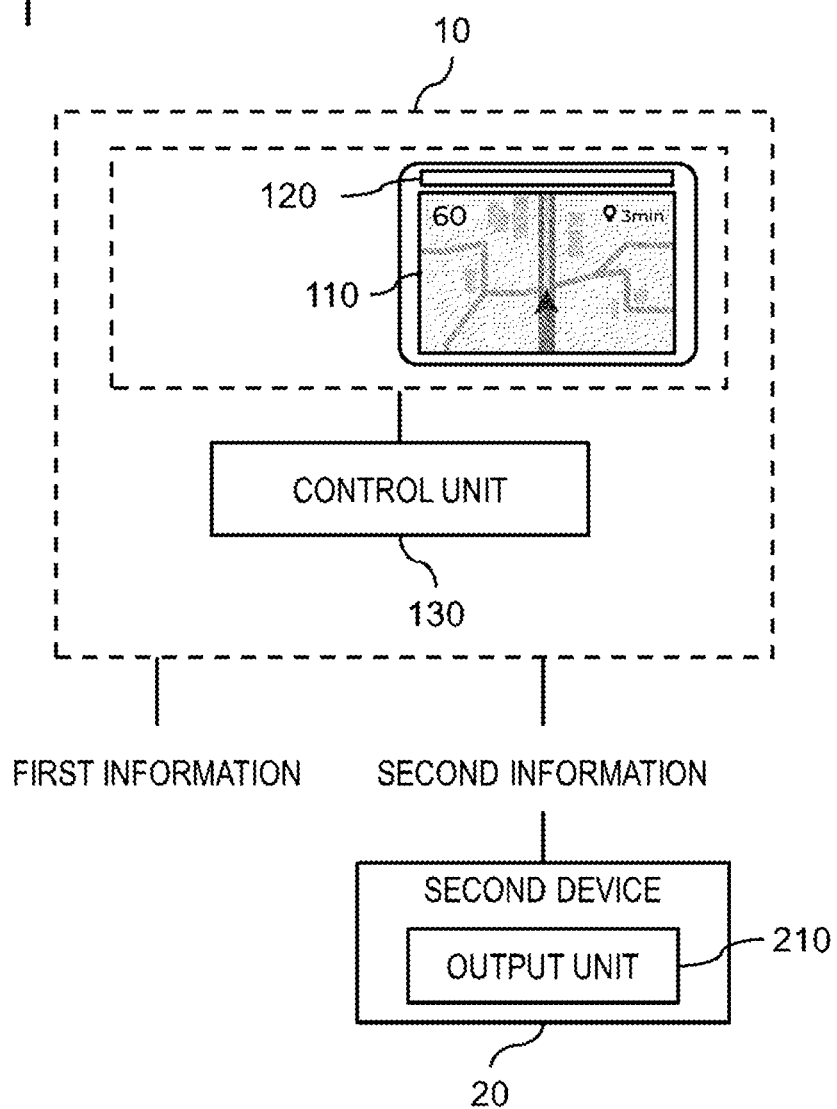
FIG. 1 is a diagram showing an example of a functional configuration of a light emitting device.

Hereinafter, embodiments of the present invention will be described with reference to the drawings. In all of the drawings, the same constituent elements are designated by the same reference numerals, and the description thereof will not be repeated as appropriate. In addition, in the diagrams illustrating the light emission state of a light emitting unit 120, a light emission region 122 in which light is not emitted is indicated as blank, and a light emission region 122 in which light is emitted is indicated using hatching or shading. Here, in the shaded light emission region 122, for example, stronger light is emitted than in the hatched light emission region 122, or light is emitted in a more vibrant color than in the hatched light emission region 122.

FIG. 1 is a diagram showing an example of a functional configuration of a light emitting device 10. The light emitting device 10 is located inside a vehicle and emits light toward an occupant compartment where an occupant is seated. The light emitting device 10 comprises the light emitting unit 120 and a control unit 130. The light emitting unit 120 has a plurality of the light emission regions 122 as will be described below. The plurality of light emission regions 122 are arranged along one direction. The control unit 130 controls the light emission region 122 using at least one of first information related to an operation of the vehicle in which the light emitting device 10 is mounted and second information related to an operation of an output unit 210 that performs output toward the occupant compartment of the vehicle.

For example, the light emitting device 10 is used together with a display 110. The display 110 is a part of a navigation device and performs display based on, for example, navigation information and a current position. An example of this display comprises information (for example, a line) on a map indicating the current position and a path that the vehicle needs to advance. The control unit that controls the display 110 may be the control unit 130 or may be different from the control unit 130. The display 110 may be a portable device that can be brought into the vehicle, or a display provided in, for example, a tablet terminal or a so-called smartphone.

The navigation information is an example of the first information described above and comprises route information to a destination. This route information comprises, for example, position information of a destination, information indicating a road on which the vehicle needs to travel, a point where a right turn or left turn needs to be made, and information indicating, in a case where there is a point where a U-turn needs to be made, whether to make a right turn or a left turn at the time of the U-turn at that point. In a case where the road on which the vehicle needs to travel has a plurality of lanes, the route information may further comprise information indicating a lane on which the vehicle needs to travel. The display 110 also displays these information as necessary, and the control unit 130 controls the plurality of light emission regions 122 using the navigation information.

The light emitting unit 120 is located, for example, along a width direction of the vehicle. In the example shown in FIG. 1, the light emitting unit 120 is located along a part of an edge of the display 110. For example, in a case where the display 110 is substantially rectangular, the light emitting unit 120 is located near an upper edge or a lower edge of the display 110. In a case where the light emitting unit 120 is located near the upper edge of the display, the occupant can recognize the light emitting unit 120 without lowering the eye gaze. Therefore, in a case where the light emitting unit 120 is located in a driver's field of vision (also including a case of a peripheral field of vision), the driver does not need to lower the eye gaze when recognizing the light emitting unit 120, which makes it possible to suppress any obstruction to driving. The width of the light emitting unit 120 is, for example, 50% or more and 130% or less and preferably 80% or more and 100% or less of the lateral width of the display 110. When the width of the light emitting unit 120 is within this range, it not only improves the designability but also facilitates cooperation between the display content of the display 110 and a light emission pattern of the light emitting unit 120. For example, in a case where a notification icon is displayed on the upper right of the display 110, light can be turned on in the light emission region 122 closest to this icon.

The light emitting unit 120 may be incorporated into the same housing as the display 110. In this case, the display 110 and the light emitting unit 120 may be incorporated into the vehicle or may be a portable device that can be brought into the vehicle, for example, a tablet terminal or a so-called smartphone.

Further, the light emitting unit 120 may be externally attached to a structure facing the occupant compartment of the vehicle, for example, a dashboard, or may be externally attached to a device having the display 110.

The control unit 130 may be incorporated into the same housing as the light emitting unit 120 or may be incorporated into a separate housing from the light emitting unit 120. For example, the control unit 130 may have a function other than controlling the light emitting unit 120, for example, a wireless communication function.

In addition, the light emitting device 10 may be used together with a second device 20. The second device 20 has an output unit 210. The output unit 210 performs output toward the occupant compartment of the vehicle, as described above. For example, in a case where the second device 20 is an audio device, the output unit 210 is a speaker, and the second information is audio information to be output by the output unit 210, for example, sound data of a music. The control unit 130 may acquire the second information used by the second device 20 and control the light emitting unit 120 using the second information. Further, the second device 20 may have a speaker. In this case, the second device 20 may be a device provided with an audio agent function, such as a smart speaker, or a device provided with a drive recorder or a parking monitoring function.

The second device 20 may be integrated with the light emitting device 10 or the display 110, or may be incorporated into the light emitting device 10 or the display 110 in advance. Further, the light emitting device 10, the second device 20, and the navigation device may be integrated into one device in advance.

Figure 2:
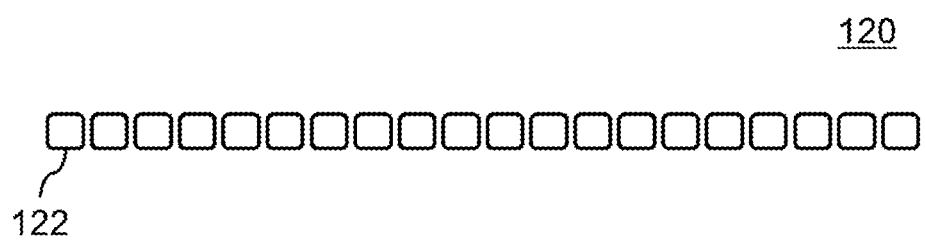
FIG. 2 is a diagram showing a configuration example of a light emitting unit.

FIG. 2 is a diagram showing a configuration example of the light emitting unit 120. In the example shown in this diagram, the light emitting unit 120 has a configuration in which the plurality of light emission regions 122 are arranged in a line. However, the light emitting unit 120 may have a configuration in which the light emission regions 122 are arranged in a plurality of columns, for example, n rows and m columns ($n \geq 3$ and $m \geq 2$). Here, n indicates the number of light emission regions 122 in a lateral direction, and m indicates the number of light emission regions 122 in a height direction. The plurality of light emission regions 122 may be located with gaps therebetween or may be continuously located without gaps. In a case where the plurality of light emission regions 122 are located with gaps therebetween, the gap between the adjacent light emission regions 122 is, for example, 0.5 mm or more and 3 mm or less.

The light emission region 122 has a light emitting element, such as an LED, for example. In each of the plurality of light emission regions 122, at least one, preferably both, of a light emission intensity and a light emission color is variable. The control unit 130 individually controls the plurality of light emission regions 122. What is controlled here is at least one, preferably both, of the light emission intensity and the light emission color. For example, the control unit 130 controls a length, a position, and a movement of a light emission bar 124, which will be described below, by selecting the light emission region 122 in which light is to be emitted.

Figure 3:
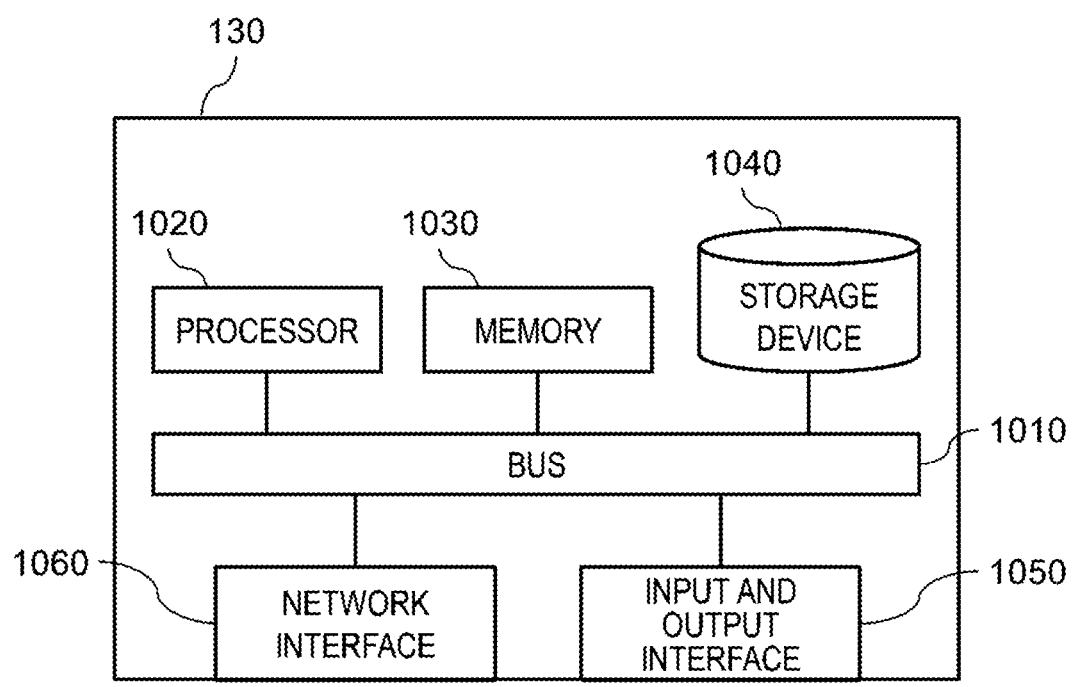
FIG. 3 is a diagram showing a hardware configuration example of a control unit.

FIG. 3 is a diagram showing a hardware configuration example of the control unit 130. The control unit 130 has a bus 1010, a processor 1020, a memory 1030, a storage device 1040, an input and output interface 1050, and a network interface 1060.

The bus 1010 is a data transmission path for transmitting and receiving data between the processor 1020, the memory 1030, the storage device 1040, the input and output interface 1050, and the network interface 1060. However, a method for connecting the processor 1020 and the like is not limited to bus connection.

The processor 1020 is a processor that is implemented using a central processing unit (CPU), a graphics processing unit (GPU), or the like.

The memory 1030 is a main storage device that is implemented using a random access memory (RAM) or the like.

The storage device 1040 is an auxiliary storage device that is implemented using a hard disk drive (HDD), a solid state drive (SSD), removable media such as a memory card, a read only memory (ROM), or the like, and has a medium. This medium stores program modules for implementing each function of the control unit 130. The processor 1020 reads and executes each of the program modules on the memory 1030 so that each function corresponding to the program module is implemented.

The input and output interface 1050 is an interface for connecting the control unit 130 and various input and output devices to each other. For example, the control unit 130 communicates with the light emitting unit 120 via the input and output interface 1050.

The network interface 1060 is an interface for connecting the control unit 130 to a network. The network is, for example, a local area network (LAN) or a wide area network (WAN). A method for connecting the network interface 1060 to the network may be a wireless connection or a wired connection. The control unit 130 may communicate with the light emitting unit 120 via the network interface 1060.

Next, an example of control of the light emitting unit 120 by the control unit 130 will be described. In first to fifth examples below, the control unit 130 controls the light emitting unit 120 using the navigation information. In addition, in a sixth example, the control unit 130 controls the light emitting unit 120 using the second information. Further, in a seventh example, the control unit 130 controls the light emitting unit 120 using the navigation information and the second information.

In each of the following examples, it is preferable that, when controlling the plurality of light emission regions 122 using the first information such as the navigation information, the control unit 130 sets a difference in the light emission color between the plurality of light emission regions 122 to be equal to or less than a reference, preferably achieves the same color, such that the light emission colors appear the same. Further, it is preferable that the control unit 130 sets the difference in the light emission intensity between the plurality of light emission regions 122 to be equal to or less than a reference, preferably achieves the same intensity, such that the light emission intensities appear the same.

Meanwhile, when controlling the plurality of light emission regions 122 using the second information, the control unit 130 freely controls both the light emission color and the light emission intensity. That is, the control unit 130 may change the light emission intensities of the plurality of light emission regions 122 or may change the light emission colors of the plurality of light emission regions 122. At this time, the control unit 130 may apply a gradation to the light emission intensity of at least a part of the light emitting unit 120 or apply a gradation to the light emission color of at least a part of the light emitting unit 120 when the light emitting unit 120 is viewed as a whole. This gradation may be in a waveform such as a triangular wave or a sine wave.

First Example

Figure 4:
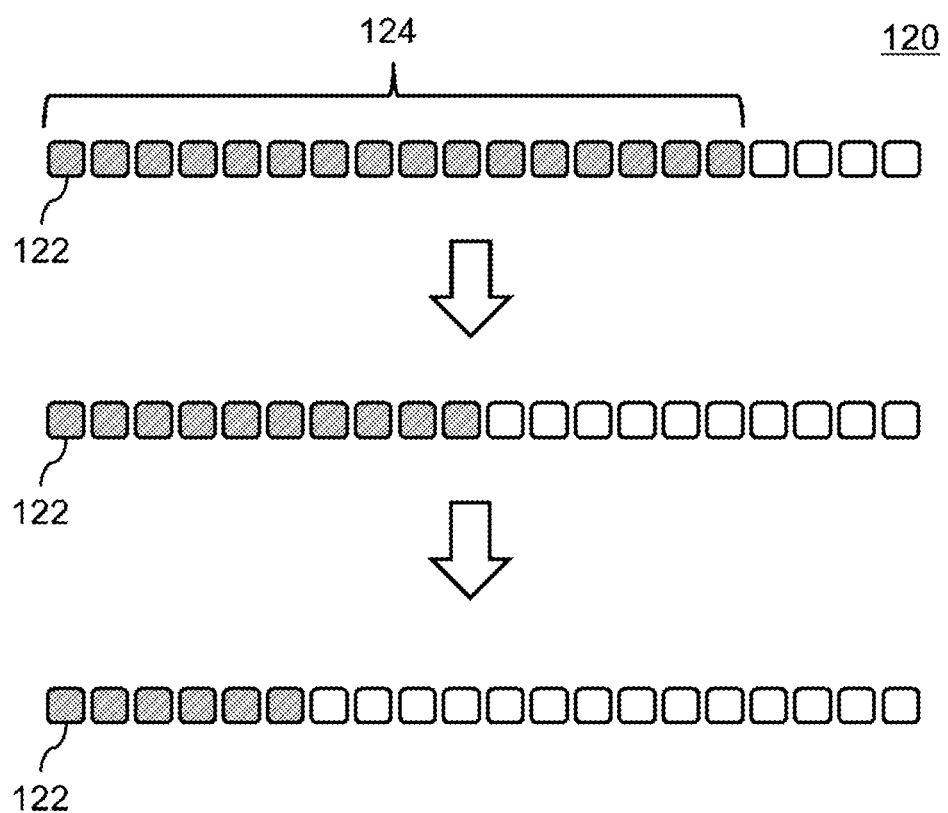
FIG. 4 is a diagram illustrating an example of control of the light emitting unit by the control unit.

In the example shown in FIG. 4, the navigation information comprises point information indicating a position of a point where the vehicle needs to change a direction of movement. This point is, for example, an intersection where a right turn or a left turn needs to be made or a point where a U-turn needs to be made. The control unit 130 controls the plurality of light emission regions 122 according to a distance between the vehicle and this point. For example, the control unit 130 reduces the number of light emission regions 122 in which light is emitted as the distance between the vehicle and the point decreases.

For example, the control unit 130 controls the plurality of light emission regions 122 to display the light emission bar 124 on the light emitting unit 120 and shortens the light emission bar 124 as the distance between the vehicle and the point decreases. At this time, for example, in a case where the above point is an intersection where a left turn needs to be made or a point where a U-turn needs to be made to the left side, the light emission bar 124 is shortened from the right side. This is as shown in FIG. 4. On the other hand, in a case where the above point is an intersection where a right turn needs to be made or a point where a U-turn needs to be made to the right side, the light emission bar 124 is shortened from the left side. This is a pattern opposite to FIG. 4, with the left and right sides reversed.

After the control shown in FIG. 4 is performed, the control unit 130 may perform control shown in the second to fourth examples, which will be described below, at the timing when the distance between the vehicle and the above point is equal or below a reference.

In addition, the control shown in FIG. 4 may be performed based on the distance between the destination and the vehicle. In this case, the control unit 130 may perform the control shown in the fifth example, which will be described below, at the timing when the distance between the vehicle and the destination is equal or below a reference.

Second Example

Figure 5:
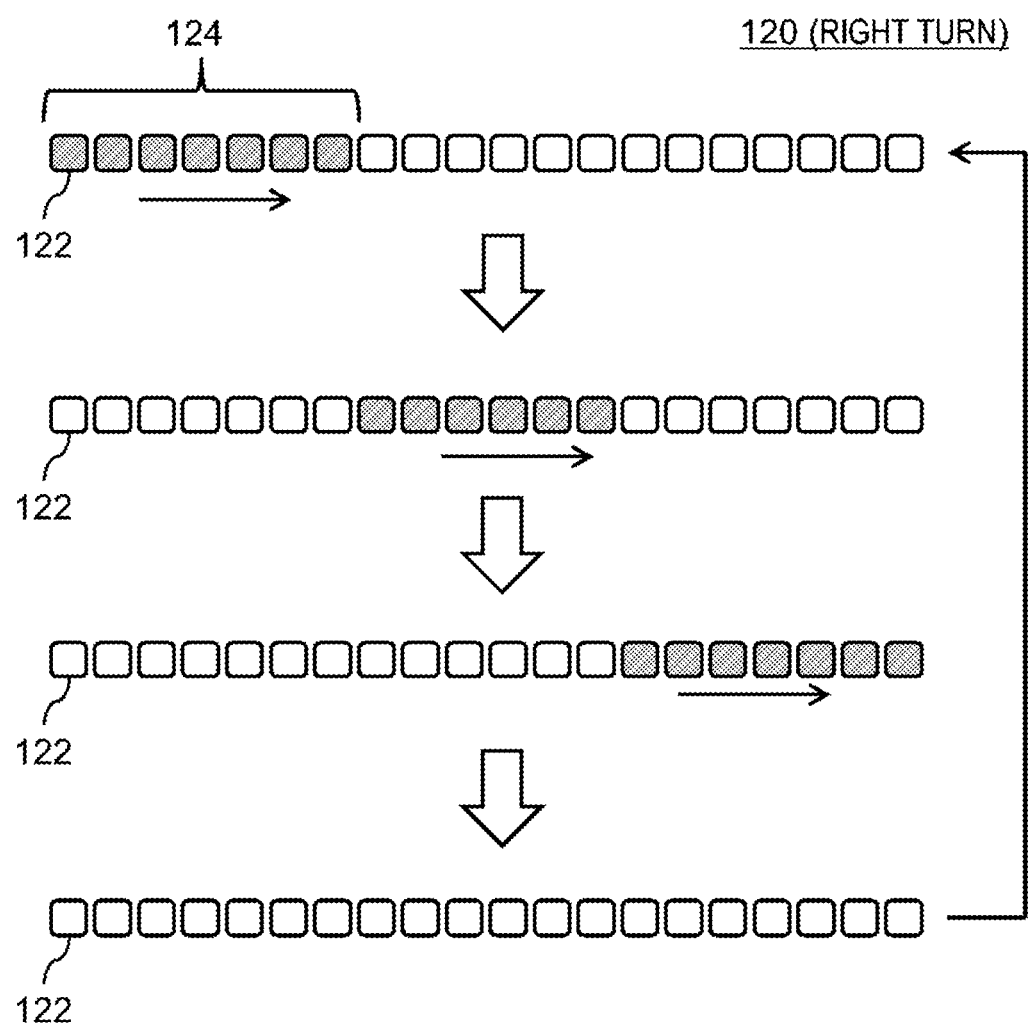
FIG. 5 is a diagram illustrating an example of control of the light emitting unit by the control unit.

In the example shown in FIG. 5, the navigation information comprises point information indicating a position of an intersection where a turn needs to be made and direction information indicating a direction in which the turn needs to be made. Then, when the positional relationship between the vehicle and the intersection satisfies a reference, for example, when the distance is equal to or below a reference value, the control unit 130 controls the plurality of light emission regions 122 using the direction information.

For example, in a case where the plurality of light emission regions 122 are aligned along the width direction of the vehicle, the control unit 130 provides the light emission bar 124 by emitting light in a first light emission region, which is a part of the plurality of light emission regions 122, and controls the plurality of light emission regions 122 such that the light emission bar 124 moves in the width direction of the vehicle. At this time, the control unit 130 controls a movement direction of the light emission bar 124 based on the direction information. For example, in a case of an intersection where a right turn needs to be made, the control unit 130 moves the light emission bar 124 from left to right. Alternatively, in a case of an intersection where a left turn needs to be made, the control unit 130 moves the light emission bar 124 from right to left. The control unit 130 displays, for example, only one light emission bar 124. However, this number is not limited to one and may be plural. In a case where a plurality of the light emission bars 124 are provided, the control unit 130 may start display of a head of the next light emission bar 124 at one end part of the light emitting unit 120 immediately before a certain light emission bar 124 completes the movement, that is, in a state in which the end of the light emission bar 124 remains at the other end part of the light emitting unit 120. The visual apparent movement speed of the light emission bar 124 to be moved suitably is a constant speed. By moving at a constant speed, the movement direction can be correctly recognized regardless of the timing at which the occupant of the vehicle views the light emitting unit.

When the light emission bar 124 has reached the end of the light emitting unit 120, the control unit 130 turns off the entire light emitting unit 120 for a predetermined time, and then forms the light emission bar 124 again to move the light emission bar 124. The control unit 130 repeats this control. A length t1 of the light-off is shorter than a length t2 of the time during which the light emission bar 124 is displayed, and for example, is equal to or more than 0.3 times and equal or less than 0.7 times the length t2. Here, it is not necessary to turn off the entire light emitting unit 120 at once. However, when the light-off is performed, the occupant can easily distinguish the current light emission pattern from other light emission patterns, for example, a light emission pattern based on the second information, which will be described below.

For example, when the control unit 130 detects that the vehicle has passed the intersection based on the position information of the vehicle (for example, information based on GPS), the control unit 130 ends the light emission pattern shown in FIG. 5. However, the control unit 130 may use a detected value of an acceleration sensor mounted in the vehicle or the light emitting device 10 to detect that a turn has been completed at the intersection and end the light emission pattern shown in FIG. 5. Further, the control unit 130 may use control information of the vehicle, for example, the steering wheel angle transition or turn signal operation information, to detect that a turn has been completed at the intersection and end the light emission pattern shown in FIG. 5. This also applies to the third example, which will be described below.

Further, the control unit 130 may control the light emitting unit 120 based on a comparison result between the navigation information and an actual trajectory of the vehicle immediately after making a turn at the intersection. For example, the control unit 130 may change a display mode of the light emitting unit 120 depending on a case where the vehicle has made a turn at the intersection as indicated by the navigation information and a case where the vehicle has passed the intersection in a different manner from the navigation information (for example, in a case of going straight or a case of making a turn in an opposite direction). For example, the control unit 130 makes at least one of the light emission color, the light emission pattern, and the light emission intensity different.

In the example shown in this diagram, the length of the light emission bar 124 does not change while the light emission bar 124 moves without overlapping the end of the light emitting unit 120. However, the length of the light emission bar 124 may change in conjunction with the movement of the light emission bar 124. Specifically, in a case of moving the light emission bar 124 from left to right, the control unit 130 gradually increases the number of light emission regions 122 in which light is emitted such that the light emission bar 124 becomes longer from the left end of the light emitting unit 120, and the light emission bar 124 is moved in a direction away from the left end after the light emission bar 124 has reached a prescribed length (a state of a first row of FIG. 5). After the light emission bar 124 has reached the right end of the light emitting unit 120 (a state of a third row in FIG. 5), the control unit 130 gradually reduces the number of light emission regions 122 in which light is emitted so that the light emission bar 124 becomes shorter toward the right end of the light emitting unit 120, and finally the entire light emitting unit 120 is turned off (a state of a fourth row of FIG. 5). By doing so, it becomes easier for the occupant to recognize the movement of the light emission bar 124. The length of the light emission bar 124 (for example, the number of light emission regions 122 constituting the light emission bar 124) is, for example, 20% or more and 70% or less and preferably 25% or more and 35% or less of the length of the light emitting unit 120 (for example, the number of light emission regions 122 constituting the light emitting unit 120), but is not limited thereto.

In a case where the output unit 210 of the second device 20 has a stereotype speaker, the control unit 130 may control the output of the speaker using the direction of the turn at the intersection. For example, the control unit 130 outputs sound from a right-side speaker in a case of making a right turn, and outputs sound from a left-side speaker in a case of making a left turn. By doing so, the occupant can more intuitively recognize the direction of the turn at the intersection. This control may be performed by a control unit of the second device 20 instead of the control unit 130.

Third Example

Figure 6:
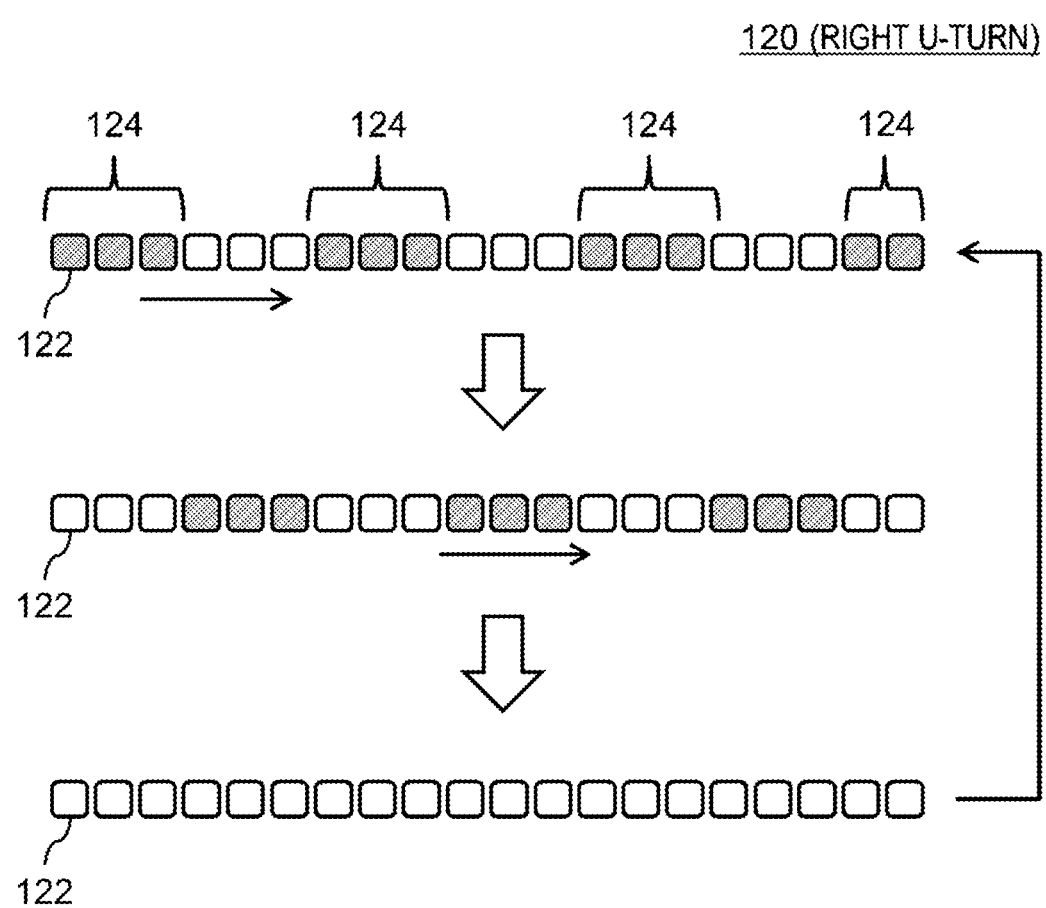
FIG. 6 is a diagram illustrating an example of control of the light emitting unit by the control unit.

In the example shown in FIG. 6, the navigation information comprises point information indicating a position where the vehicle needs to make a U-turn. Then, when a positional relationship between the vehicle and the position where the U-turn needs to be made satisfies a reference, for example, when the distance is equal to or below a reference value, the control unit 130 controls the plurality of light emission regions in accordance with a predetermined rule. The light emission pattern in accordance with this predetermined rule is different from the light emission pattern when making a right turn or a left turn at the intersection.

For example, in a case where the plurality of light emission regions 122 are aligned along the width direction of the vehicle and the navigation information comprises information indicating a direction in which a U-turn needs to be made, the control unit 130 forms the light emission bar 124 by emitting light in a part of the plurality of light emission regions 122 and controls the plurality of light emission regions 122 such that the plurality of light emission bars 124 move in the width direction. At this time, the control unit 130 makes at least one of the number and the length of the light emission bar 124 different from when making a right turn or a left turn at the intersection. Then, the control unit 130 controls the movement direction of the light emission bar based on the direction in which the U-turn needs to be made. For example, in a case where a U-turn needs to be made to the right side, the control unit 130 moves the light emission bar 124 from left to right. Alternatively, in a case of an intersection where a U-turn needs to be made to the left side, the control unit 130 moves the light emission bar 124 from right to left. Displaying the plurality of light emission bars 124 as they move allows the occupant of the vehicle to distinguish a U-turn from other corresponding displays such as a right turn and a left turn.

After displaying the light emission bar 124 for a first time, the control unit 130 turns off the entire light emitting unit 120 for a second time and thereafter forms the light emission bar 124 again to move the light emission bar 124. The control unit 130 repeats this control. A length t3 of the first time is shorter than a length t4 of the second time and is, for example, equal to or more than 0.3 times and equal to or less than 0.7 times the length t4.

In this example as well, the length of the light emission bar 124 does not change while the light emission bar 124 moves without overlapping the edge of the light emitting unit 120.

In a case where the output unit 210 of the second device 20 has a stereotype speaker, the control unit 130 may control the output of the speaker using the direction of the U-turn. For example, the control unit 130 outputs sound from the right-side speaker in a case of making a U-turn to the right, and outputs sound from the left-side speaker in a case of making a U-turn to the left. By doing so, the occupant can more intuitively recognize the direction of the U-turn. This control may be performed by the control unit of the second device 20 instead of the control unit 130.

Fourth Example

Figure 7:
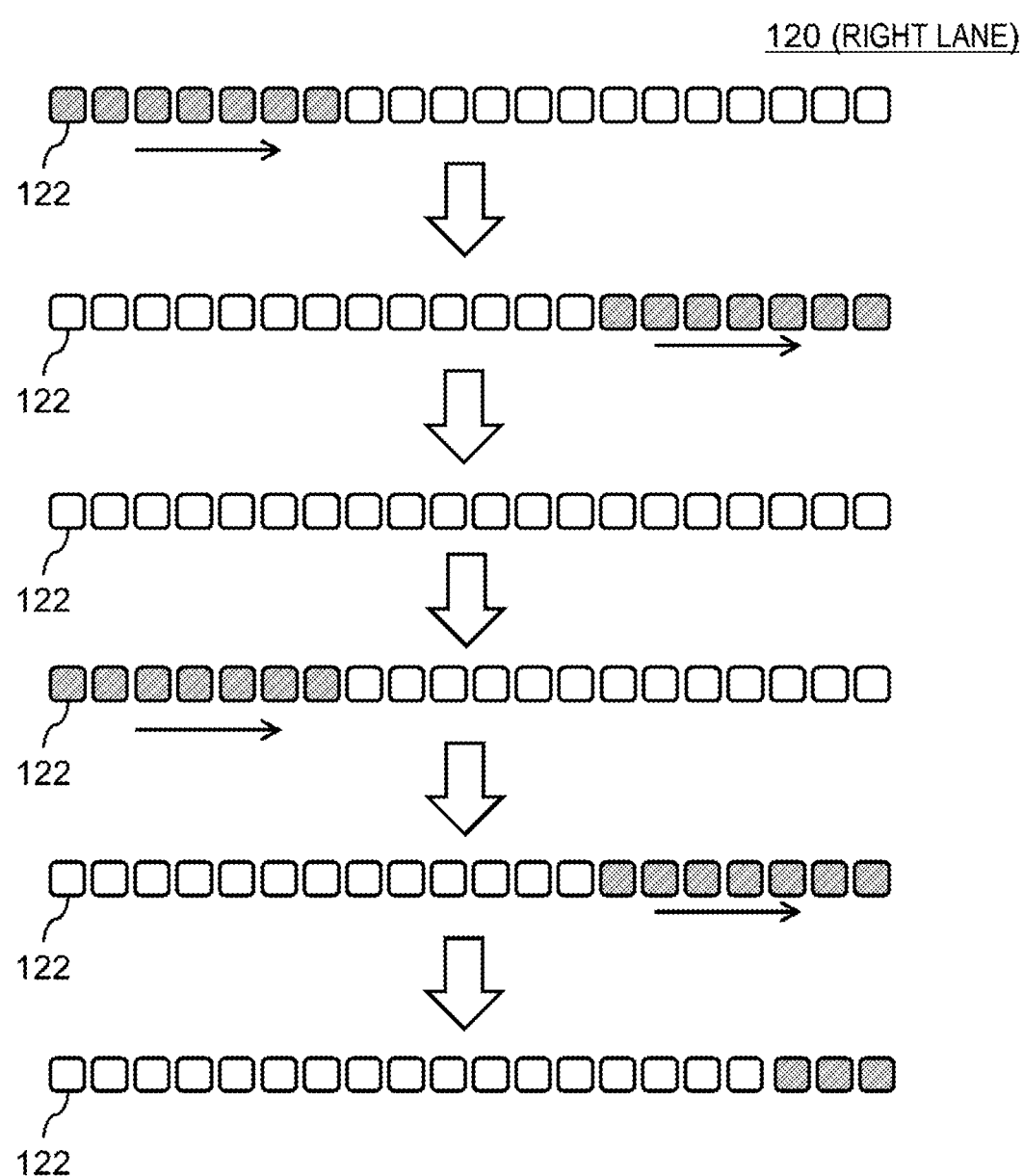
FIG. 7 is a diagram illustrating an example of control of the light emitting unit by the control unit.

In the example shown in FIG. 7, the navigation information comprises lane information indicating a lane on which the vehicle needs to travel on a road with a plurality of lanes. The control unit 130 controls the plurality of light emission regions using the lane information.

For example, in a case where the plurality of light emission regions 122 are aligned along the width direction of the vehicle, the control unit 130 forms the light emission bar 124 by emitting light in a part of the plurality of light emission regions 122 and controls the plurality of light emission regions 122 such that the light emission bar 124 moves in the width direction. At this time, the control unit 130 controls the movement direction of the light emission bar 124 based on the position of the lane indicated by the lane information. For example, in a case where the vehicle needs to travel on a rightmost lane, the control unit 130 moves the light emission bar 124 from left to right. In addition, in a case of an intersection where the vehicle needs to travel on a leftmost lane, the control unit 130 moves the light emission bar 124 from right to left.

The length of the light emission bar 124 does not change while the light emission bar 124 moves without overlapping the edge of the light emitting unit 120. However, the length of the light emission bar 124 may change in conjunction with the movement of the light emission bar 124. By doing so, it becomes easier for the occupant to recognize the movement of the light emission bar 124. The length of the light emission bar 124 (for example, the number of light emission regions 122 constituting the light emission bar 124) is, for example, 20% or more and 70% or less and preferably 25% or more and 35% or less of the length of the light emitting unit 120 (for example, the number of light emission regions 122 constituting the light emitting unit 120), but is not limited thereto.

When the light emission bar 124 has reached the edge of the light emitting unit 120, the control unit 130 turns off the entire light emitting unit 120 for a predetermined time, and then forms the light emission bar 124 again to move the light emission bar 124. A length t5 of the light-off is shorter than a length t6 of the time during which the light emission bar 124 is displayed, and for example, is equal to or more than 0.3 times and equal or less than 0.7 times the length t6. Here, it is not necessary to turn off the entire light emitting unit 120 at once. However, when the light-off is performed, the occupant can easily distinguish the current light emission pattern from other light emission patterns, for example, a light emission pattern based on the second information, which will be described below.

After that, when the light emission bar 124 has reached the edge of the light emitting unit 120 again, the control unit 130 displays the light emission bar 124 in a state in which the light emission bar 124 is shortened for a predetermined time, and then turns off the light emission bar 124 in the shortened state, and immediately after that, forms the light emission bar 124 again to move the light emission bar 124.

Fifth Example

Figure 8:
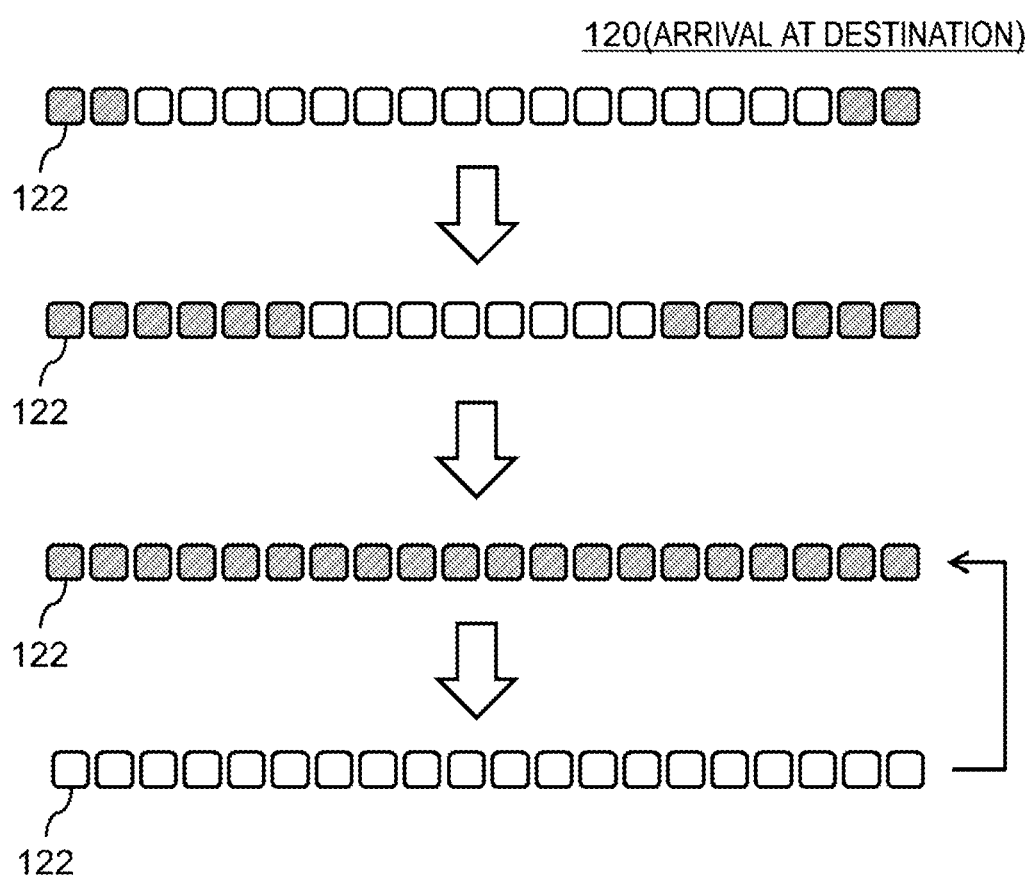
FIG. 8 is a diagram illustrating an example of control of the light emitting unit by the control unit.

In the example shown in FIG. 8, the navigation information comprises point information indicating a destination of the vehicle. The control unit 130 controls the plurality of light emission regions 122 according to a positional relationship between the vehicle and the destination. For example, in a case where the distance between the vehicle and the destination is equal to or below a reference value, the control unit 130 controls the plurality of light emission regions 122 with a pattern different from the first example described above. The reference value of this distance is, for example, smaller than the reference value of the distance for ending the light emission pattern in the first example.

For example, the control unit 130 increases the number of light emission regions 122 in which light is gradually emitted from both edges of the light emitting unit 120, finally emits light in all the light emission regions 122, and then repeats a light emission mode in which light is emitted in all the light emission regions 122 and a light-off mode in which light is turned off in all the light emission regions 122 a predetermined number of times. A length of the light emission mode and a length of the light-off mode are each, for example, 0.3 seconds or more and 2 seconds or less. The predetermined number of times is, for example, equal to or more than two times and equal to or less than four times.

Sixth Example

Figure 9:
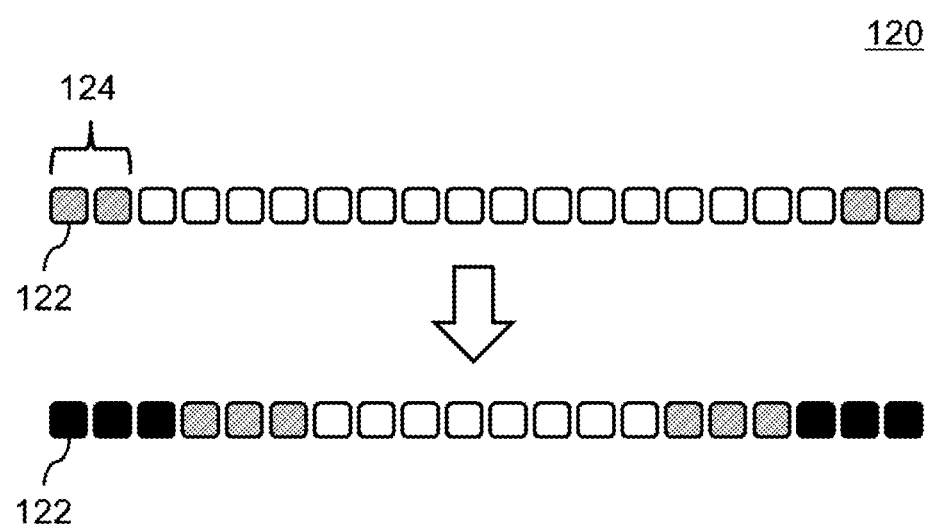
FIG. 9 is a diagram illustrating an example of control of the light emitting unit by the control unit.
Figure 10:
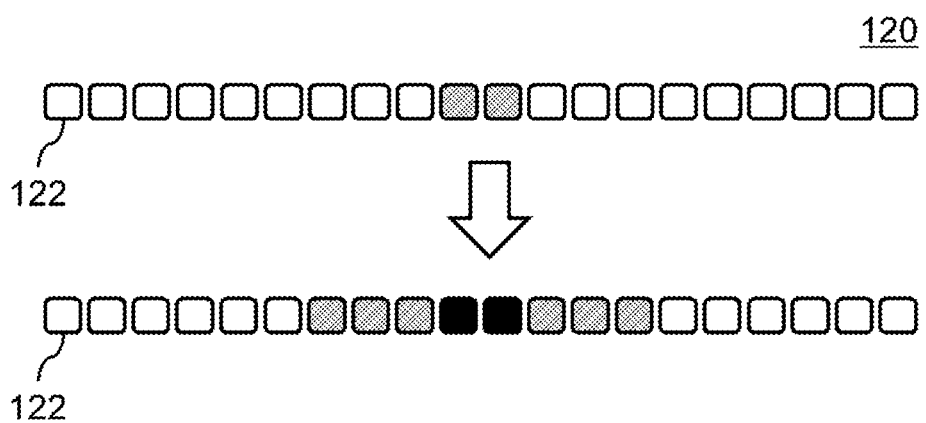
FIG. 10 is a diagram illustrating an example of control of the light emitting unit by the control unit.

In the example shown in FIGS. 9 and 10, the output unit 210 of the second device 20 outputs sound, and the second information relates to sound data to be input to the output unit 210. The control unit 130 controls the light emitting unit 120 in accordance with the sound data to be input to the second device 20. At this time, the control unit 130 controls the light emitting unit 120 to be synchronized with the sound to be output from the output unit 210 of the second device 20. The sound data may be various kinds of data related to sound, such as at least one of music data, sound data comprised in a video, speech audio data from an audio agent, warning sound data, and guidance sound data.

For example, the control unit 130 changes the length of the light emission bar 124 in synchronization with the sound pressure of the sound to be output from the output unit 210. At this time, the control unit 130 may apply a gradation to the color of the light emission bar 124. In the example shown in FIG. 9, starting points of the light emission bars 124 are both edges of the light emitting unit 120. Meanwhile, in the example shown in FIG. 10, the starting point of the light emission bar 124 is the central part of the light emitting unit 120.

The control unit 130 may change whether to use the light emission pattern shown in FIG. 9 or the light emission pattern shown in FIG. 10 depending on the type of sound to be output from the output unit 210, for example, the genre of music. In addition, the control unit 130 may change the color and the gradation of the light emission bar 124 depending on the type of sound to be output from the output unit 210, for example, the genre of music. Further, the control unit 130 may change at least one of the light emission pattern of the light emitting unit 120, the color of the light emission bar 124, and the gradation of the light emission bar 124 for each audio agent. By controlling light emission for each audio agent, the occupant can easily identify the audio agent that is currently speaking.

Seventh Example

Figure 11:
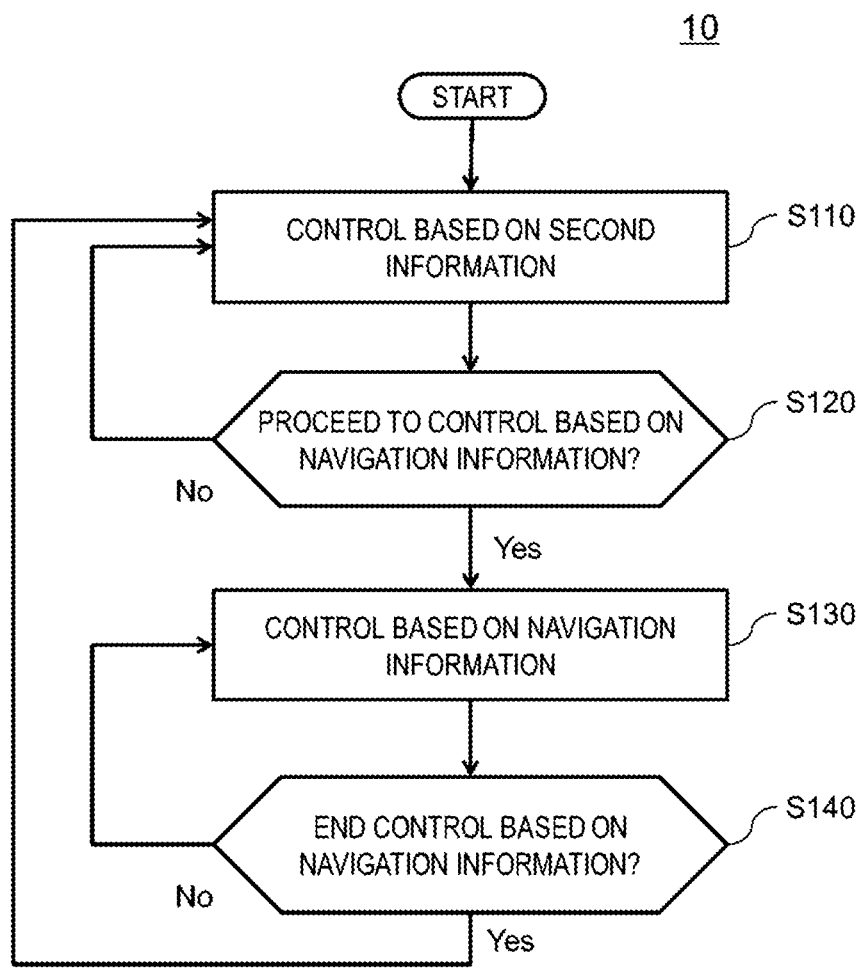
FIG. 11 is a diagram illustrating an example of control of the light emitting unit by the control unit.

In the example shown in FIG. 11, the output unit 210 of the second device 20 outputs sound, and the second information relates to sound data to be input to the output unit 210. The control unit 130 controls the plurality of light emission regions 122 using the first information, for example, the navigation information, and controls the plurality of light emission regions 122 using the second information.

For example, the control unit 130 controls the plurality of light emission regions 122 using the second information when there is no information to be conveyed to a person inside the vehicle, for example, the driver. The control example at this time is the sixth example described above (step S110).

After that, when there is the first information to be conveyed to the occupant inside the vehicle, for example, the driver, for example, when it becomes necessary to convey at least part of the navigation information to the driver (step S120: Yes), the control unit 130 controls the light emission region 122 using this first information through interrupt processing (step S130). The control example at this time is at least one of the first to fifth examples described above. At this time, the control unit 130 makes the light emission color of the light emitting unit 120 different between the control based on the first information and the control based on the second information. By making the color different, the occupant can clearly recognize the first information that the driver needs to recognize.

After that, when there is no longer a need to perform the control using the first information, for example, when the intersection has been passed or a U-turn has been made (step S140: Yes), the control unit 130 uses the second information to control the plurality of light emission regions 122 (step S110).

In the second example described above, at least one of the length of the light emission bar 124, the region in which the light emission bar 124 can be displayed, and the movement speed of the light emission bar 124 may be changed according to an angle of the right turn or an angle of the left turn.

Figure 12:
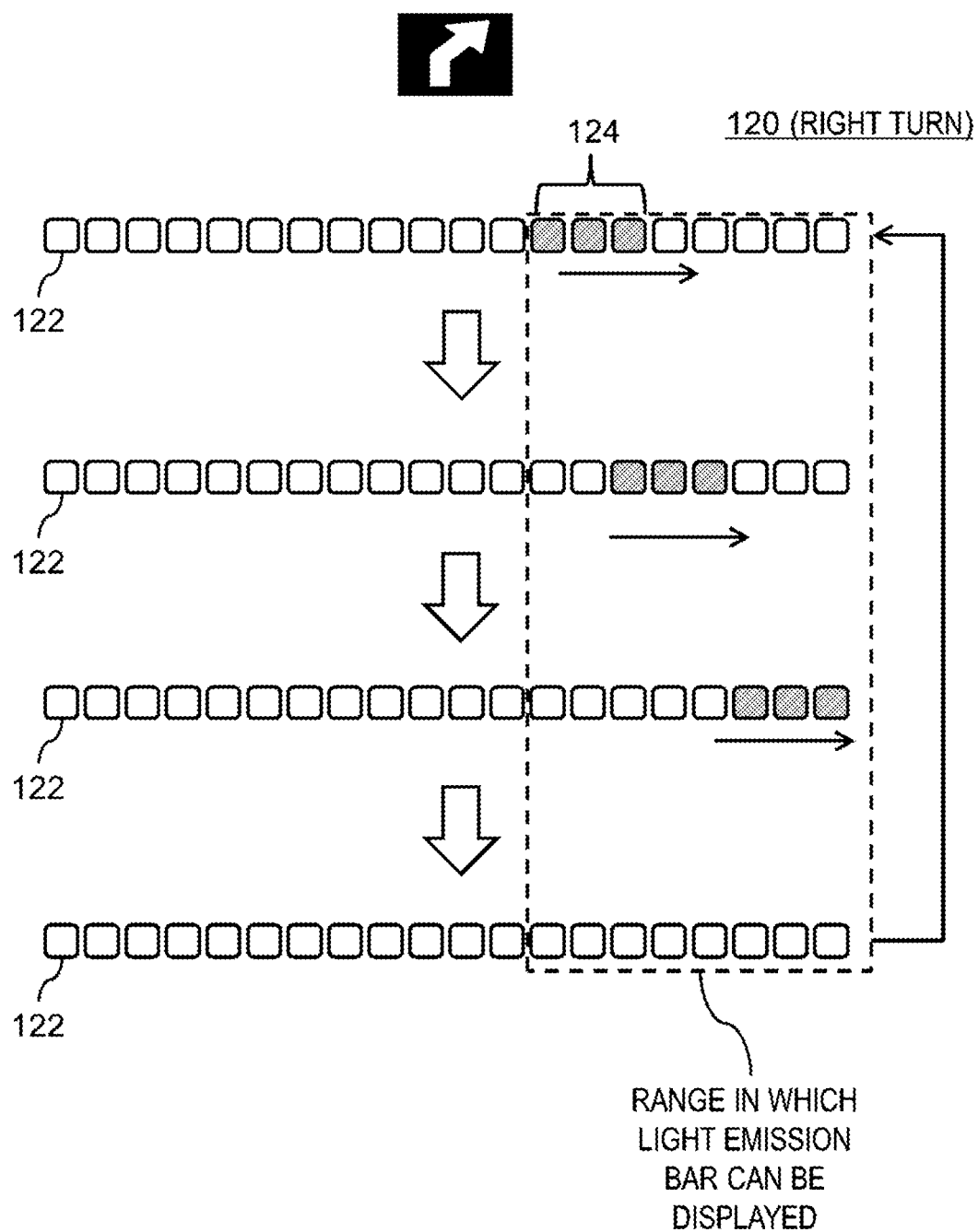
FIG. 12 is a diagram illustrating an example of control of the light emitting unit by the control unit.
Figure 13:
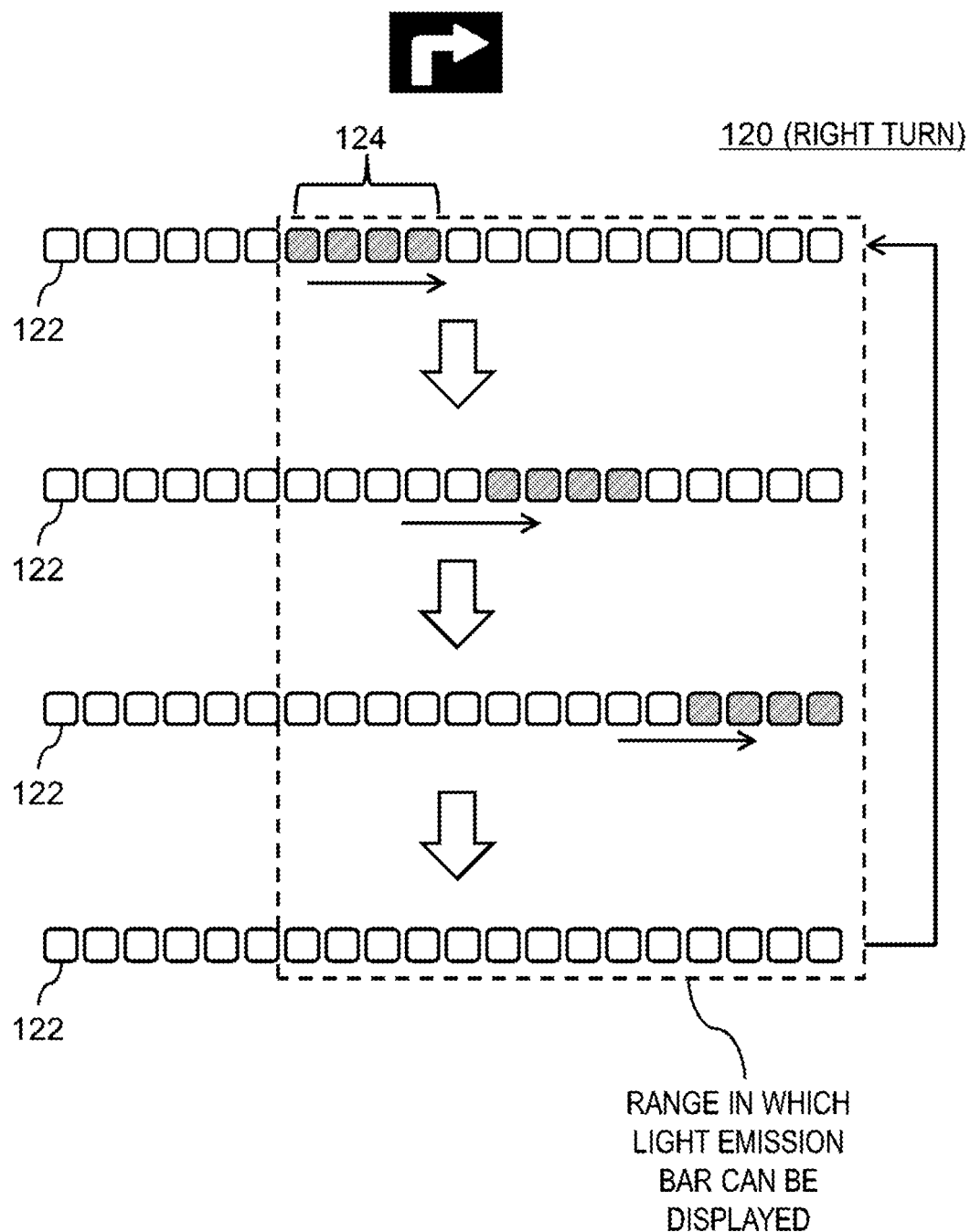
FIG. 13 is a diagram illustrating an example of control of the light emitting unit by the control unit.
Figure 14:
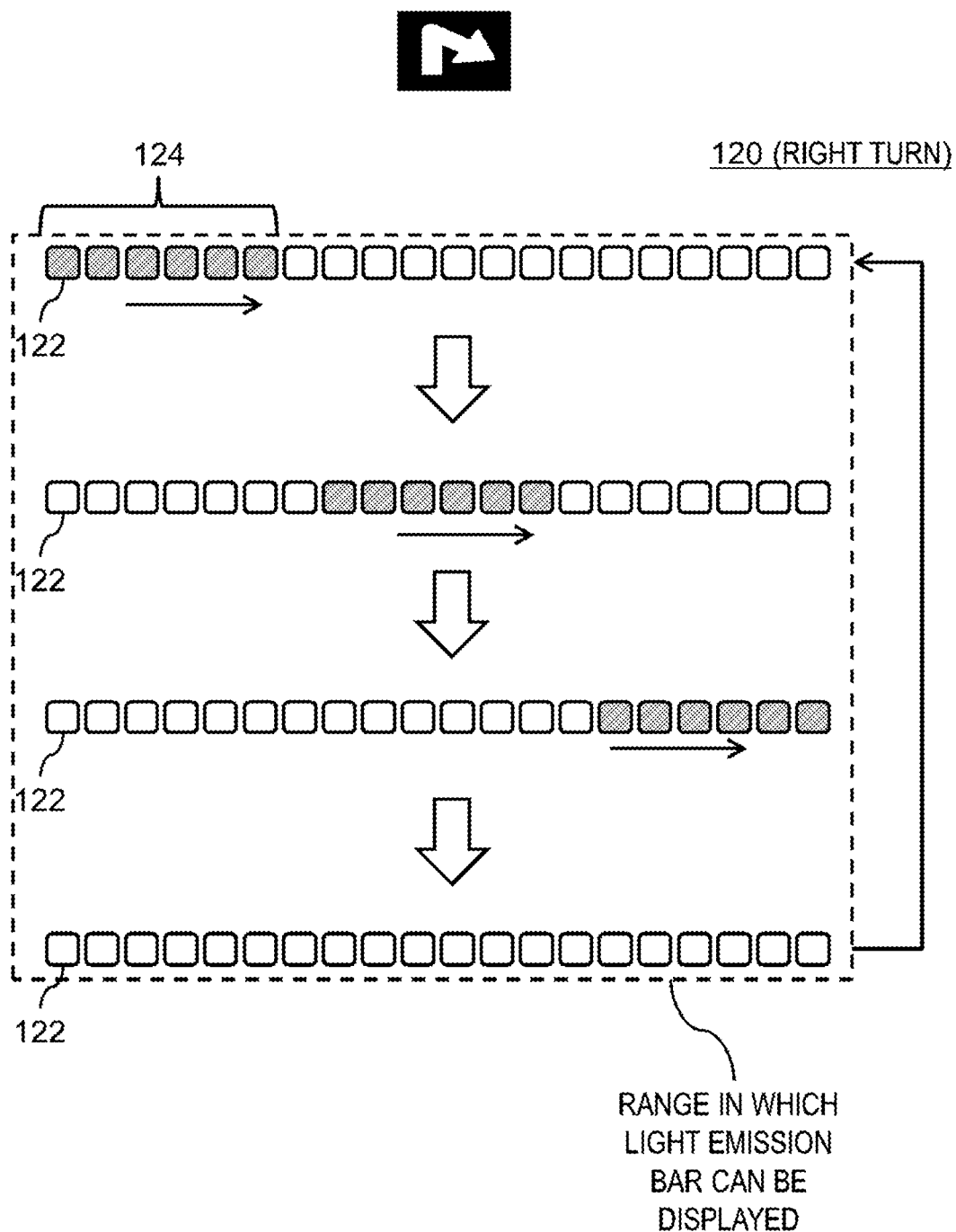
FIG. 14 is a diagram illustrating an example of control of the light emitting unit by the control unit.

This example will be described with reference to FIGS. 12, 13, and 14. FIG. 12 shows an example of a case where the angle of the right turn or the angle of the left turn is more than a predetermined range including 90 degrees (for example, 70 degrees or more and 110 degrees or less). FIG. 13 shows an example of a case where the angle of the right turn or the angle of the left turn is within the predetermined range. FIG. 14 shows an example of a case where the angle of the right turn or the angle of the left turn is smaller than the predetermined range.

In the examples shown in these diagrams, when the angle of the right turn or the angle of the left turn increases, the control unit 130 shortens the length of the light emission bar 124, narrows the region in which the light emission bar 124 can be displayed, and increases the movement speed of the light emission bar 124. That is, in the case of FIG. 12, the length of the light emission bar 124 is shorter, the region in which the light emission bar 124 can be displayed is narrower, and the movement speed of the light emission bar 124 is faster than in the case of FIG. 13. In addition, in the case of FIG. 13, the length of the light emission bar 124 is shorter, the region in which the light emission bar 124 can be displayed is narrower, and the movement speed of the light emission bar 124 is faster than in the case of FIG. 14.

By doing so, a person inside the vehicle, for example, the driver, can easily grasp the angle of the right turn or the angle of the left turn.

Modification Example

FIG. 15 is a diagram showing an example of a functional configuration of a light emitting device 10 according to a modification example. In the present modification example, the control unit 130 of the light emitting device 10 has a function of controlling the light emitting unit 120 using a detection result of an acceleration sensor 132 in the vehicle, in addition to the functions described above. The acceleration sensor 132 may be incorporated, for example, as a part of the light emitting device 10, for example, as a part of the control unit 130, or may be provided in the vehicle separately from the light emitting device 10.

The acceleration sensor 132 detects, for example, vibrations occurring in the parked vehicle. An example of the cause of this vibration is an attempt to open or close a door or a collision with a person or an object to the vehicle. Then, the control unit 130 causes the light emitting unit 120 to emit light with a predetermined pattern when the acceleration sensor 132 detects the vibration at a timing when the vibration is not expected to occur under normal condition, for example, while the vehicle is parked. Hereinafter, one example of the processing will be described.

When it is detected that the power supply of electrical equipment mounted on a front panel of the vehicle has been turned off, for example, an engine key of the vehicle with an engine has been turned off, the control unit 130 enters a parking monitoring mode. This parking monitoring mode is a mode in which the light emitting unit 120 emits light with a first pattern when the acceleration sensor 132 detects vibration.

Here, during the monitoring mode, the control unit 130 may continue to cause the light emitting unit 120 to emit light with a second pattern when the acceleration sensor 132 does not detect vibration. An example of the second pattern is to periodically turn on light in a part of the plurality of light emission regions 122.

When the acceleration sensor 132 detects vibration, control unit 130 causes the light emitting unit 120 to emit light with the first pattern. An example of the first pattern is turning on light in all the light emission region 122. The first pattern may be causing light to blink in all the light emission regions 122.

After that, when it is detected that the power supply of electrical equipment mounted on the front panel of the vehicle has been turned on, for example, the engine key of the vehicle with the engine has entered a predetermined standby mode, the control unit 130 releases the parking monitoring mode described above.

Here, the control unit 130 may cause the light emitting unit 120 to emit light with a predetermined pattern when there was a timing when the control unit 130 had emitted light with the first pattern during the parking monitoring mode. An example of the predetermined pattern is causing light blink in a part of the plurality of light emission regions 122. By doing so, the user of the vehicle can recognize that vibration has occurred in the vehicle while the vehicle was parked, for example, someone had attempted to open or close the door.

As described above, according to the present embodiment, it is possible to convey information to a person inside the vehicle through the light emission state of the light emitting unit 120. In addition, since the light emission state differs depending on the type of information to be conveyed, the person inside the vehicle can easily recognize the information. Further, for example, in a case where the light emitting unit 120 is located within a range of the peripheral field of vision of the driver of the vehicle, the driver can recognize the information from the light emitting unit 120 even in a case where the driver's viewpoint is not on the light emitting unit 120. Therefore, even in a case where the light emitting device 10 is provided, it is possible to suppress any obstruction to driving.

Although the embodiments of the present invention have been described above with reference to the drawings, these are examples of the present invention, and various configurations other than the above can also be adopted.

In addition, in the plurality of flowcharts used in the above description, a plurality of steps (processes) are described in order. However, the execution order of the steps to be executed in each of the embodiments is not limited to the order of that description. In each of the embodiments, the order of the steps shown in the diagram can be changed within a range that does not affect the content. Further, the above embodiments can be combined within a range where their contents do not contradict each other.

REFERENCE SIGNS LIST

10 Light emitting device
20 Second device
110 Display
120 Light emitting unit
130 Control unit
210 Output unit

What is claimed is:

1. A light emitting device that is disposed inside a vehicle and emits light toward an occupant compartment where an occupant is seated, the light emitting device comprising:
    a light emitting unit that has a plurality of light emission regions aligned along one direction; and
    a control unit that controls the light emitting unit,
    wherein the control unit controls at least one of a light emission intensity and a light emission color of the light emission region for each of the plurality of light emission regions,
    wherein the control unit is configured to control the plurality of light emission regions using at least one of first information related to an operation of the vehicle and second information related to an operation of an output unit configured to perform output toward the occupant compartment,
    wherein the first information comprises navigation information for guiding a movement direction of the vehicle,
    wherein the control unit controls the plurality of light emission regions using the navigation information,
    wherein the navigation information comprises point information indicating a position of an intersection where the vehicle needs to make a turn, and direction information indicating a direction in which the vehicle needs to make the turn at the intersection, and
    wherein the control unit is configured to control the plurality of light emission regions using the direction information when a positional relationship between the vehicle and the intersection satisfies a reference.

2. The light emitting device according to claim 1,
    wherein the navigation information comprises point information indicating a position of a point where the vehicle needs to change a direction of movement, and
    the control unit controls the plurality of light emission regions according to a distance between the vehicle and the point.

3. The light emitting device according to claim 2, wherein, as the distance between the vehicle and the point decreases, a number of light emission regions in which light is emitted is reduced.

4. The light emitting device according to claim 1,
    wherein the plurality of light emission regions is aligned along a width direction of the vehicle, and
    wherein the control unit is configured to:
        form a light emission bar by emitting light in a part of the plurality of light emission regions and control the plurality of light emission regions such that the light emission bar moves in the width direction; and
        control a movement direction of the light emission bar based on the direction information.

5. A light emitting device that is disposed inside a vehicle and emits light toward an occupant compartment where an occupant is seated, the light emitting device comprising:
    a light emitting unit that has a plurality of light emission regions aligned along one direction; and
    a control unit that controls the light emitting unit,
    wherein the control unit controls at least one of a light emission intensity and a light emission color of the light emission region for each of the plurality of light emission regions,
    wherein the control unit is configured to control the plurality of light emission regions using at least one of first information related to an operation of the vehicle and second information related to an operation of an output unit configured to perform output toward the occupant compartment, wherein the first information comprises navigation information for guiding a movement direction of the vehicle, wherein the control unit controls the plurality of light emission regions using the navigation information, wherein the navigation information comprises point information indicating a position where the vehicle needs to make a U-turn, and wherein the control unit controls the plurality of light emission regions in accordance with a predetermined rule when a positional relationship between the vehicle and the position where the U-turn needs to be made satisfies a reference.

6. The light emitting device according to claim 5,
wherein the plurality of light emission regions is aligned along a width direction of the vehicle,
wherein the navigation information comprises information indicating a direction in which the U-turn needs to be made, and
wherein the control unit is configured to:
form a light emission bar by emitting light in a part of the plurality of light emission regions and control the plurality of light emission regions such that the light emission bar moves in the width direction; and
control a movement direction of the light emission bar based on the direction in which the U-turn needs to be made.

7. The light emitting device according to claim 1,
wherein the navigation information comprises lane information indicating a lane on which the vehicle needs to travel on a road with a plurality of lanes, and
wherein the control unit is configured to control the plurality of light emission regions using the lane information.

8. A light emitting device that is disposed inside a vehicle and emits light toward an occupant compartment where an occupant is seated, the light emitting device comprising:
a light emitting unit that has a plurality of light emission regions aligned along one direction; and
a control unit that controls the light emitting unit,
wherein the control unit controls at least one of a light emission intensity and a light emission color of the light emission region for each of the plurality of light emission regions,
wherein the control unit is configured to control the plurality of light emission regions using at least one of first information related to an operation of the vehicle and second information related to an operation of an output unit configured to perform output toward the occupant compartment,
wherein the first information comprises navigation information for guiding a movement direction of the vehicle,
wherein the control unit controls the plurality of light emission regions using the navigation information,
wherein the navigation information comprises lane information indicating a lane on which the vehicle needs to travel on a road with a plurality of lanes,
wherein the control unit is configured to control the plurality of light emission regions using the lane information, and
wherein the control unit is configured to:
control the plurality of light emission regions such that a light emission bar moves in a width direction; and
control a movement direction of the light emission bar based on a position of the lane indicated by the lane information.

9. The light emitting device according to claim 1,
wherein the navigation information comprises point information indicating a destination of the vehicle, and
wherein the control unit controls the plurality of light emission regions according to a positional relationship between the vehicle and the destination.

10. The light emitting device according to claim 1,
wherein the light emission colors of the plurality of light emission regions are variable, and
wherein the control unit sets a difference in the light emission color between the plurality of light emission regions to be equal to or less than a reference when controlling the plurality of light emission regions using the first information.

11. The light emitting device according to claim 1,
wherein the output unit outputs sound,
wherein the second information relates to sound data to be input to the output unit, and
wherein the control unit controls the plurality of light emission regions using the first information and control the plurality of light emission regions using the second information.

12. The light emitting device according to claim 1,
wherein the plurality of light emission regions is aligned along at least a part of an edge of a display configured to perform display using the navigation information.

13. The light emitting device according to claim 1,
wherein the output unit outputs sound,
wherein the second information relates to sound data to be input to the output unit, and
wherein the control unit controls the plurality of light emission regions using the second information.

14. A control method of a light emitting device that is located inside a vehicle and emits light toward an occupant compartment where an occupant is seated, the light emitting device including a light emitting unit that has a plurality of light emission regions aligned along one direction, the control method comprising:
through at least one computer,
controlling at least one of a light emission intensity and a light emission color of the light emission region for each of the plurality of light emission regions; and
controlling the plurality of light emission regions using at least one of first information related to an operation of the vehicle and second information related to an operation of an output unit configured to perform output toward the occupant compartment,
wherein the first information comprises navigation information for guiding a movement direction of the vehicle,
wherein the controlling the plurality of light emission regions further uses the navigation information,
wherein the navigation information comprises point information indicating a position of an intersection where the vehicle needs to make a turn, and direction information indicating a direction in which the vehicle needs to make the turn at the intersection, and
wherein the controlling the plurality of light emission regions controls the plurality of light emission regions using the direction information when a positional relationship between the vehicle and the intersection satisfies a reference.

15. The light emitting device according to claim 1, wherein the control unit controls the light emission intensity of each of the plurality of light emission regions according to an angle of the turn indicated by the direction information when the positional relationship between the vehicle and the intersection satisfies a reference.

16. The light emitting device according to claim 15, wherein the plurality of light emission regions is aligned along a width direction of the vehicle, and wherein the control unit is configured to form a light emission bar by emitting light in a part of the plurality of light emission regions and control the plurality of light emission regions such that the light emission bar moves in the direction in which the vehicle needs to make a turn based on the direction information, and wherein the control unit controls the plurality of light emission regions such that a movement speed of the light emission bar is faster when the angle of the turn indicated by the direction information is greater than a reference angle compared to when the angle of the turn is smaller than the reference angle.

17. The light emitting device according to claim 15, wherein the control unit controls the plurality of light emission regions such that a light emission pattern differs when the vehicle makes a right or left turn and when the vehicle makes a U-turn at the intersection.

18. A control method of a light emitting device that is located inside a vehicle and emits light toward an occupant compartment where an occupant is seated, the light emitting device including a light emitting unit that has a plurality of light emission regions aligned along one direction, the control method comprising:

controlling at least one of a light emission intensity and a light emission color of the light emission region for each of the plurality of light emission regions; and controlling the plurality of light emission regions using at least one of first information related to an operation of the vehicle and second information related to an operation of an output unit configured to perform output toward the occupant compartment, wherein the first information comprises navigation information for guiding a movement direction of the vehicle, wherein the controlling the plurality of light emission regions further uses the navigation information, wherein the navigation information comprises point information indicating a position where the vehicle needs to make a U-turn, and wherein the controlling the plurality of light emission regions controls the plurality of light emission regions in accordance with a predetermined rule when a positional relationship between the vehicle and the position where the U-turn needs to be made satisfies a reference.

19. A control method of a light emitting device that is located inside a vehicle and emits light toward an occupant compartment where an occupant is seated, the light emitting device including a light emitting unit that has a plurality of light emission regions aligned along one direction, the control method comprising:

controlling at least one of a light emission intensity and a light emission color of the light emission region for each of the plurality of light emission regions; and controlling the plurality of light emission regions using at least one of first information related to an operation of the vehicle and second information related to an operation of an output unit configured to perform output toward the occupant compartment, wherein the first information comprises navigation information for guiding a movement direction of the vehicle, wherein the controlling the plurality of light emission regions further uses the navigation information, wherein the navigation information comprises lane information indicating a lane on which the vehicle needs to travel on a road with a plurality of lanes, wherein the controlling the plurality of light emission regions further uses the lane information, wherein, in the controlling the plurality of light emission regions, a light emission bar moves in a width direction, and wherein, in the controlling the plurality of light emission regions, a movement direction of the light emission bar is controlled based on a position of the lane indicated by the lane information.

\* \* \* \* \*